United States Patent
Kristlbauer et al.

(10) Patent No.: US 11,819,155 B2
(45) Date of Patent: Nov. 21, 2023

(54) USED CAPSULE RECEPTACLE FOR BEVERAGE MACHINES

(71) Applicant: SOCIETE DES PRODUITS NESTLE S.A., Vevey (CH)

(72) Inventors: Jurgen Kristlbauer, Zollikofen (CH); Alain Teklits, Corsier (CH)

(73) Assignee: Societe des Produits Nestle S.A., Vevey (CH)

( * ) Notice: Subject to any disclaimer, the term of this patent is extended or adjusted under 35 U.S.C. 154(b) by 520 days.

(21) Appl. No.: 16/969,669

(22) PCT Filed: Feb. 13, 2019

(86) PCT No.: PCT/EP2019/053476
§ 371 (c)(1),
(2) Date: Aug. 13, 2020

(87) PCT Pub. No.: WO2019/158542
PCT Pub. Date: Aug. 22, 2019

(65) Prior Publication Data
US 2020/0397182 A1    Dec. 24, 2020

(30) Foreign Application Priority Data

Feb. 14, 2018 (EP) ..................................... 18156589

(51) Int. Cl.
*A47J 31/44* (2006.01)
*A47J 31/40* (2006.01)
*A47J 31/36* (2006.01)

(52) U.S. Cl.
CPC ......... *A47J 31/4403* (2013.01); *A47J 31/407* (2013.01); *A47J 31/3633* (2013.01)

(58) Field of Classification Search
CPC ... A47J 31/4403; A47J 31/407; A47J 31/3633
See application file for complete search history.

(56) References Cited

U.S. PATENT DOCUMENTS

| | | | |
|---|---|---|---|
| 2009/0277535 A1* | 11/2009 | Wang | B67D 3/0032 222/164 |
| 2013/0112084 A1 | 5/2013 | Favero et al. | |

FOREIGN PATENT DOCUMENTS

| CN | 101080358 A | 11/2007 |
|---|---|---|
| CN | 201005523 Y | 1/2008 |

(Continued)

OTHER PUBLICATIONS

China Patent Office Communication for Application No. 201980010203.X, dated Jan. 26, 2022, 19 pages.

*Primary Examiner* — Nathaniel E Wiehe
*Assistant Examiner* — Keith Brian Assante
(74) *Attorney, Agent, or Firm* — K&L Gates LLP

(57) ABSTRACT

A capsule beverage machine (1) has: a passage (2) for evacuating used capsules (100); a capsule collector (10) having a bottom (11) and sidewalls (12,12') delimiting a cavity (13) with a cavity entry opening (14) and a cavity volume for storing the used capsules (100); and a seat (20) into which the evacuation passage (2) leads, the collector (10) having a collection position in which the collector (10) is removably located in the seat (20) for collecting capsules (100) delivered via the passage (2) and the entry opening (14). The seat (20) and the collector (10) are configured to adjust the cavity volume of the cavity (13) so that the cavity volume is smaller when the collector (10) is located in the seat and larger at removal of the collector (10) from the seat. The sidewalls (12,12') include at least one sidewall (12') that is movably mounted in the collector (10). The seat (20) and/or the movable sidewall (12') has an interacting seat member (21). The member (21) protrudes from the movable sidewall (12') towards a side (22) of the seat (20) or from the side (22) of the seat (20) towards the movable sidewall (12'). When the collector (10) is in its collection position, the member (21) is urged against the side (22) of the seat (20)

(Continued)

or against the movable sidewall (12'), whereby the movable sidewall (12') is displaced towards an inside (10') of the cavity (13). The movable sidewall (12') is allowed to move towards an outside (20') of the cavity (13) when the movable sidewall (12') is withdrawn from the seat (20).

20 Claims, 1 Drawing Sheet

(56) References Cited

FOREIGN PATENT DOCUMENTS

| CN | 102984976 A | 3/2013 |
|----|-------------|--------|
| JP | 2001222761  | 8/2001 |
| WO | 2009074559  | 6/2009 |
| WO | 2009135869  | 11/2009 |

\* cited by examiner

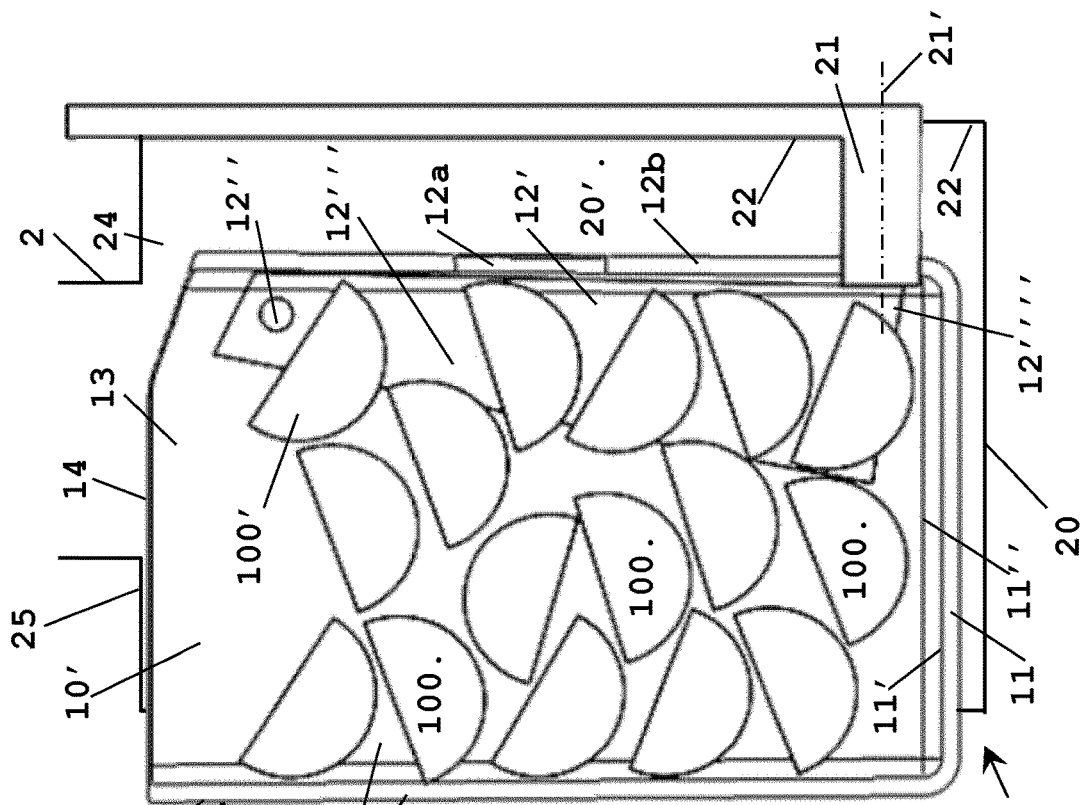
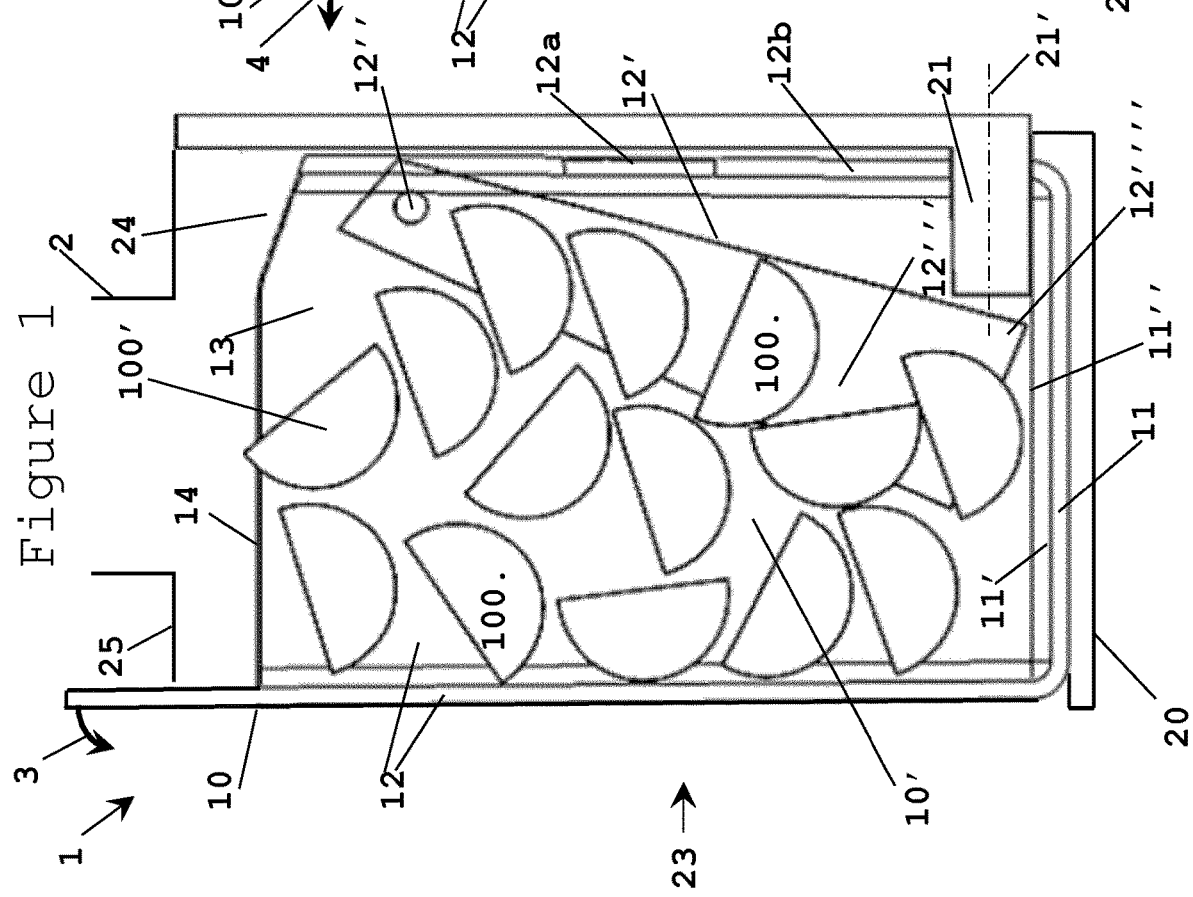

USED CAPSULE RECEPTACLE FOR BEVERAGE MACHINES

CROSS REFERENCE TO RELATED APPLICATIONS

The present application is a National Stage of International Application No. PCT/EP2019/053476, filed on Feb. 13, 2019, which claims priority to European Patent Application No. 18156589.6, filed on Feb. 14, 2018, the entire contents of which are being incorporated herein by reference.

FIELD OF THE INVENTION

The field of the invention pertains to capsule beverage preparation machines having a collector for collecting used capsules, the collector being easily removable from the machine for emptying.

For the purpose of the present description, a "beverage" is meant to include any human-consumable liquid substance, such as tea, coffee, hot or cold chocolate, milk, soup, baby food, etc. . . . . . A "capsule" is meant to include any pre-portioned beverage ingredient, such as a flavouring ingredient, within an enclosing packaging of any material, in particular an airtight packaging, e.g. plastic, aluminium, recyclable and/or biodegradable packagings, and of any shape and structure, including soft pods or rigid cartridges containing the ingredient. The capsule may contain an amount of ingredient for preparing a single beverage serving or a plurality of beverage servings.

BACKGROUND ART

Certain beverage preparation machines use capsules containing ingredients to be extracted or to be dissolved; for other machines, the ingredients are stored and dosed automatically in the machine or else are added at the time of preparation of the drink.

Most beverage machines possess within a housing: filling means that include a pump for liquid, usually water, which pumps the liquid from a source of water that is cold or indeed heated through heating means, such as a heating resistor, a boiler, a thermoblock or the like, a brewing unit in which an ingredient is brewed with water or a mixing unit in which ingredients are mixed together, and a beverage outlet for dispensing the prepared beverage. Typically, the beverage outlet is located above a beverage dispensing zone, e.g. above a grid for supporting a cup or other recipient under the outlet and for the passage of drops of liquid from the beverage outlet or other spills into a collector tray located under the grid.

The use of capsules, such as plastic and/or aluminium-based capsules for the preparation of beverages has many advantages. Capsules, in particular aluminium-based capsules can be made hermetic or gas tight and thus can protect the beverage ingredient effectively during an extended period of time against the environment such as air, humidity or light, before use of the ingredient. Thus such capsules prevent premature degradation of the ingredient. In any case, capsules of a beverage ingredient are easy to handle, hygienic, and their use involves less cleaning of the beverage preparation machine, in particular no significant part of the machine's extraction chamber comes into contact with the beverage ingredient contained in the capsule during the extraction process.

Capsules are usually inserted individually into the machine's extraction chamber, manually or automatically from a capsule. Hot or cold water is then passed through the capsule for brewing or otherwise extracting the ingredient(s) contained within the capsule and form the desired beverage. The prepared beverage is supplied via an outlet of the machine into a cup, mug or other receptacle to the user.

Used capsules may either be removed individually from the liquid food or beverage preparation machine after each preparation cycle or they may be collected in a machine's used capsule receptacle for instance as mentioned in EP 1 731 065.

Typically, the capsule receptacle is located underneath the capsule chamber so that the capsules fall by gravity into the receptacle upon extraction. In the latter case, the receptacle has to be emptied by the user when full. The receptacle may be a drawer-type removable receptacle located in a seat of the beverage preparation machine typically under the extraction chamber. The used capsule receptacle may be slid in and out of the machine's housing.

A problem may arise with such capsule receptacles, in particular in conjunction with rigid capsules, when used capsules accumulate in the receptacle to form a heap of capsules whose top extends above the receptacle in such a manner to come into conflict with the housing when the receptacle is slid out of the machine's housing for emptying.

A solution to avoid the jamming of the receptacle by used capsules is to provide an optical level detector for measuring the level of capsules in the used capsule receptacle and inviting the user to empty the receptacle when the level of capsules comes close to the level of the machine's housing. Another solution involves counting the number of capsule extractions after emptying the receptacle and inviting the user to empty the receptacle after a predetermined number of capsules has been collected, an excess of which may possibly cause jamming.

A drawback with the level detector system involves the use of expensive electronic detectors, in particular optical detectors. Furthermore, since the accumulated capsules naturally form a heap in the receptacle a waste of space is usually also involved around this heap. A drawback of the capsule counting system lies in the fact that, in order to avoid jamming, it is necessary to set a maximum number of collectible capsules in the receptacle that will often lead to a poor filling of the receptacle when the user is invited to re-empty the receptacle and to an even greater waste of space around the heap of collected capsules in the receptacle than with the above described level detector.

WO 2009/074559 discloses a beverage machine having a seat for a removable used-capsule collector. The seat has a body that projects into the collector when the collector is in the seat and that is out of the collector when the collector is removed from the seat, so as to increase the storage space of the collector at removal and prevent clogging by capsules evacuated to the collector. The body may be static in the machine and enter into the collection cavity of the collector at insertion of the collector. The body may be a piston movable in the seat when the collector is housed in the seat so as to move a sidewall of the collector inwards into the collector's collection cavity. The seat may combine a movable piston and a static body so configured that the movable piston moves the entire collector to allow the static body enter the collector's collection cavity.

WO 2009/135869 discloses a beverage machine having a seat for a removable used-capsule collector that is tiltable in the seat at removal to prevent clogging when the collector is overfilled with capsules.

SUMMARY OF THE INVENTION

The invention relates to a machine for preparing a beverage. The beverage preparation machine can be an in-home or out of home machine. The machine may be for the preparation of coffee, tea, chocolate, cacao, milk, soup, baby food, etc. . . . .

The machine may be arranged for preparing within a beverage preparation unit a beverage by passing hot or cold water or another liquid through a capsule containing an ingredient, such as a flavoring ingredient, of the beverage to be prepared, such as ground coffee or tea or chocolate or cacao or milk powder.

The beverage preparation typically includes the mixing of a plurality of beverage ingredients, e.g. water and milk powder, and/or the infusion of a beverage ingredient, such as an infusion of ground coffee or tea with water. One or more of such ingredients may be supplied in loose and/or agglomerate powder form and/or in liquid form, in particular in a concentrate form. A carrier or diluents liquid, e.g. water, may be mixed with such ingredient to form the beverage. Typically, a predetermined amount of beverage is formed and dispensed on user-request, which corresponds to a serving. The volume of such a serving may be in the range of 25 to 200 ml and even up to 400 or 1000 ml, e.g. the volume for filling a cup or a mug, depending on the type of beverage. Formed and dispensed beverages may be selected from ristrettos, espressos, lungos, cappuccinos, latte macchiato, café latte, americano coffees, teas, etc. . . . . In particular, a coffee machine may be configured for dispensing espressos, e.g. an adjustable volume of 20 to 60 ml per serving, and/or for dispensing lungos, e.g. a volume in the range of 70 to 150 ml per serving, and/or for dispensing americanos, e.g. a volume in the range of 150 to 500 ml.

The machine may include a (stationary) frame and/or an outside housing in which and/or to which the machine's components, e.g. the components mentioned below including the below mentioned capsule collector, are assembled. Exemplary beverage preparation architectures are for example disclosed in WO 2009/074550 and WO 2009/130099.

For instance, the beverage preparation unit is assembled to a machine's frame, e.g. an outside housing.

In an embodiment, the ingredient is supplied within a capsule to the beverage preparation unit. Such a capsule may have a container covered by a lid e.g. a container and/or a lid extending radially to form a flange.

In the processing configuration, the processing unit may form an ingredient chamber for containing and processing the ingredient.

Examples of ingredient processing units are described in WO 2007/135135, WO 2009/043630, WO 2011/042400, WO 2014/096122 and WO 2014/096123.

The processing unit can be configured to process a capsule containing the beverage ingredient. The unit can have an ingredient chamber with at least one capsule opener, such as at least one of: one or more puncturing and/or tearing elements; and one or more pins and/or blades, such as a capsule piercer or tearing plate, e.g. as known from EP 0 512 468, EP 0 512 470, EP 1 299 022, EP 1 339 305, WO 2013/026845, WO 2014/076041, WO 2015/022342, WO 2015/022344 and WO 2015/022345.

The machine may further include a liquid driver, such as a pump, for driving a liquid, e.g. water, along a liquid line from a liquid source, such as a liquid reservoir, via the processing module. Examples of pumps in beverage machines are disclosed in WO 2006/005425, WO 2009/024500, WO 2009/150030, WO 2010/108700 and WO 2011/107574, Liquid may be driven in the processing unit via a thermal conditioner such as a heater and/or a cooler.

A suitable heater may be a boiler, a thermoblock or an on demand heater (ODH), for instance an ODH disclosed in EP 1 253 844, EP 1 380 243 and EP 1 809 151. Other heaters are disclosed in WO 2009/043851, WO 2009/043865, WO 2009/092746 and WO 2011/157675 and WO 2012/007260.

The invention relates in particular to a machine for preparing a beverage from an ingredient contained in a capsule.

The machine has a passage for evacuating such ingredient capsule upon preparing a beverage from such capsule by the machine.

The machine includes a capsule collector having a bottom and sidewalls delimiting a cavity with a cavity entry opening, such as a top opening. The cavity has a cavity volume for storing such used capsules. For instance, the cavity can store 3 to 50 used capsules, such as 5 to 25 capsules, e.g. 10 to 15 capsules.

The machine has a seat positioned so that the evacuation passage leads into the seat. The capsule collector has a collection position in which the collector is located in the seat for collecting in the storage cavity capsules delivered into the storage cavity via the evacuation passage and the entry opening. The collector is removable from the seat for emptying the storage cavity.

The seat and the collector are configured to adjust the cavity volume of the cavity so that the cavity volume is smaller when the collector is located in the seat and larger at removal of the collector from the seat.

The sidewalls of the collector comprise at least one sidewall that is movably mounted in the collector. The seat and/or the movable sidewall comprises or is associated with at least one interacting seat member.

The interacting seat member is configured so as to:
protrude from the movable sidewall towards a side of the seat and be urged thereagainst when the collector is in its collection position so that the movable sidewall is displaced by the seat member towards an inside of the cavity, the movable sidewall being allowed to move towards an outside of the cavity when the movable sidewall with the seat member is withdrawn from the side; or
protrude inwards from a side of the seat and be urged against the movable sidewall when the collector is in its collection position so that the movable sidewall is displaced by the seat member towards an inside of the cavity, the movable sidewall being allowed to move towards an outside of the cavity when the movable sidewall is withdrawn from the seat member and/or when the seat member is withdrawn from the movable sidewall.

The sidewalls may comprise a single or a plurality of movable sidewalls that is/are movable by and/or with one or more such protruding seat members.

Typically the movable sidewall(s) is/are movable relative to the bottom of the collector and optionally relative to a sidewall that is stationary relative to the bottom of the collector. Such a stationary sidewall may form an outside face of the machine when the collector is in its collection position.

When the seat member is comprised by or associated with the seat, the seat member can be stationary or movable relative to the seat.

The seat member (and typically the seat) may be shielded or substantially shielded by the mobile sidewall from any exposure to liquid supplied to the cavity via the evacuation passage, e.g. liquid carried by such evacuated capsule. For instance, the mobile sidewall has a surface for draining liquid to the bottom of the collector.

By providing such a configuration, the capsules and liquids supplied to the collector may be confined so as to prevent or substantially inhibit exposure of the machine's seat thereto.

The movable sidewall may be allowed to move towards: the outside of the cavity when the collector is moved out of the seat thereby withdrawing the movable sidewall from the seat member or withdrawing the seat member from the sidewall, or withdrawing the movable sidewall with the seat member from the side of the seat; and the inside of the cavity when the collector is moved into the seat thereby urging the movable sidewall against the side with the seat member or urging the seat member with the sidewall against the side of the seat.

The seat member may be stationary in the seat.

The seat member can be movable in the seat and associated therewith, the movable sidewall, when the collector is in its collection position, being allowed to move towards: the inside of the cavity when the seat member is moved towards the inside of the cavity; and the outside of the cavity when the seat member is moved opposite the inside of the cavity.

The bottom of the collector may delimit in the cavity a liquid collection recess having a lowest end, the movable sidewall, when moved towards the outside as well as when moved towards the inside of the cavity, being entirely located spaced above the lowest end of the recess. The recess can be covered by a partition, such as a perforated wall or a grid, for supporting capsules spaced above the lowest end of the recess, the movable sidewall being entirely located above the partition.

The bottom of the collector can be a non-articulated and impervious part, such as a bottom formed as a monolithic element and/or cast and/or machined as a single element.

One or more sidewalls of the collector sidewalls different to the mobile sidewall can be integral with or rigidly fixed to the bottom, the movable sidewall being movable relative to the bottom of the collector.

The movable sidewall may be translatable towards the inside of the cavity, optionally the movable sidewall comprising or being associated with or being contacted and urged by the seat member at a middle part and/or at opposite peripheral parts of the movable sidewall.

The movable sidewall may be pivotable towards the inside of the cavity and/or towards the outside of the cavity.

The movable sidewall can be pivotable about an upper end part of the movable sidewall.

The movable sidewall may be pivotally mounted via a pivoting bearing to one or more sidewalls of the collector sidewalls different to the mobile sidewall. The pivoting bearing can be located at a top or at a middle part of the one or more sidewalls. If the pivoting bearing is located at a middle part of such one or more sidewalls and the movable sidewall extends predominantly or essentially below the bearing, a top collector sidewall may be located above the movable sidewall, e.g. between the movable sidewall and a top end of the one or more sidewalls.

The movable sidewall can be lowerable (e.g. translationally) towards to the bottom when pivoted towards the inside of the cavity and raisable e.g. translationally) above the bottom when pivoted towards the outside of the cavity.

The movable sidewall may comprise or be associated with or be contacted and urged by the seat member at an end part, e.g. a lower end part, or at a middle part of the movable sidewall.

The movable sidewall may have towards the cavity inside a generally shovel-like surface, such as a surface formed by a pair of opposite, uprightly extending, lateral wings that are angled towards the inside of the cavity. Optionally the wings are angled along a curved and/or straight direction. The wings can have a size that is greater at a lower part of the movable sidewall than at an upper part of the movable sidewall.

Providing a movable sidewall with a shovel-like surface may facilitate the movement of the capsules inwards the collector's cavity and/or improve the confinement of the capsules and possibly liquids inside the cavity.

The collector may have a containment arrangement configured to prevent, e.g. to physically interfere with, a movement of the movable sidewall allowing an escape of a collected capsule from the cavity between the sidewall and the bottom. The containment arrangement may be configured to prevent a movement of a lower end of the movable sidewall substantially beyond the bottom of the container. The containment arrangement may include a transverse extending member, such as a panel. Such member may delimit a passage for the seat member to reach the movable sidewall.

The seat can have a front opening and at least one of: a rear face that is opposite the front opening, the collector being insertable into the seat towards the rear face via the front opening until the collector is in its collection position; and a side face that is adjacent the front opening, the collector being insertable into the seat along the side face via the front opening until the collector is in its collection position. The seat member may be located on or adjacent to such seat face.

The collector may have a single movable sidewall, e.g. adjacent to the rear face or to the side face when the collector is in its collection position.

The collector may have a pair of movable sidewalls, e.g. two movable sidewalls that face each other across the collector's cavity and that are optionally adjacent the front opening or two movable sidewalls that are adjacent to one another and that are optionally adjacent to the rear face and to a side face, when the collector is in its collection position.

The collector may have three movable sidewalls. For instance, such three movable sidewalls have a pair of sidewalls with face each other across the collector's cavity and one movable sidewall that extends between the pair of facing movable sidewalls. The movable sidewalls can be adjacent the front opening and the rear face respectively when the collector is in its collection position.

The seat can have a or the above front opening and a seat member actuation direction which is:

generally parallel to a direction or insertion of the collector into the seat and/or a direction of removal of the collector from the seat, the seat member acting against the movable sidewall or against the side of the seat along the actuation direction, the movable sidewall extending for instance generally transversally to the insertion and/or removal direction to form a back sidewall; and/or generally transverse to a direction of insertion of the collector into the seat and/or a direction of removal of the collector from the seat, the movable sidewall extending for instance generally in parallel to the insertion and/or removal direction to form a lateral sidewall, optionally the seat member and movable sidewall or the side of the seat cooperating together along an inclined plane to convert a longitudinal movement of the collector to or from its collection position into a transverse movement of the moveable sidewall.

The seat can have an upper member, such as a confinement wall, between the capsule evacuation passage and an exit area for the collector from the seat. The exit area can be delimited by a or the above front opening. The upper member may extend down to a level adjacent to or sufficiently close to the cavity entry opening so as to be below an upper end of a capsule substantially protruding through the cavity entry opening when the capsule collector is located in its collection position and the cavity is overfilled with capsules. Such substantially protruding capsule may be lowered in the cavity when the movable sidewall is allowed to move towards the outside of the cavity so as to increase the cavity volume at removal of the collector from its collection position.

The upper member may: delimit a or the above front opening of the seat; and/or be spaced from the cavity entry opening by a distance of less than 4 cm, such as in the range of 1.5 to 3.5 cm or below 1.5 cm, for example in the range of 0.5 to 10 mm e.g. 1 to 5 mm.

The capsule collector may be generally tilted out of the seat, in which case a sufficient distance should space the cavity entry opening from the upper confinement wall, e.g. a distance in the range of 1 to 4.5 cm.

The capsule collector may be generally translationally withdrawn from the seat, in which case no noticeable distance is required between the upper confinement wall and the cavity entry opening, e.g. a distance in the range of 0.5 mm to 15 mm, such as 1 to 3 mm is sufficient.

A collector's sidewall extending across a seat's front opening can form a front wall of the collector that is accessible by a user of the machine.

Whether the collector is tilted and/or translated out of the seat, the collector's front wall may extend above the cavity opening and may even extend above the upper confinement wall. Such a collector front wall may be used as a grip to remove the collector from the seat and/or as a cover element for the machine above the seat.

Alternatively, the collector's front wall may have a top end at about the level of the cavity entry opening.

The cavity volume of the cavity when the collector is in the seat and the movable sidewall is urged towards the inside of the cavity, on the one hand, and the cavity volume of the cavity when the collector is out of the seat, on the other hand, can have a cavity volume ratio in the range of 75 to 95%, such as 80 to 90% e.g. about 85%.

The machine may include an extraction seat for receiving a capsule to be extracted so as to form a beverage and for evacuating to the passage such capsule upon extraction. For instance, the extraction seat can be connected to an incoming liquid line, such as a water line, that is configured to supply liquid to the capsule for its extraction. The liquid line may include a liquid driver, e.g. a pump, for driving the liquid to the seat and/or a thermal conditioner, e.g. a heater and/or a cooler, for thermally conditioning the supplied liquid.

The machine may include a control unit for controlling at least one electric machine components, such as a liquid driver, thermal conditioner, user-interface, actuator of the extraction seat, actuator of the seat member (when the seat member is movable relative to the seat) etc. . . . . Examples of control units and user-interfaces are disclosed in WO 2008/138710, WO 2009/043851, WO 2009/043865, WO 2009/092745, WO 2010/003932, WO 2010/037806, WO 2010/046442, WO 2011/020779, WO 2011/026853, WO 2011/054889, WO 2011/067156, WO 2011/067157, WO 2011/067181, WO 2011/067188, WO 2011/067191, WO 2011/067227, WO 2011/067232, WO 2011/144719, WO 2012/032019, WO 2012/072761, WO 2012/072764, WO 2012/072767 and WO 2012/093107.

The beverage prepared by the machine may be directed to an area for placing a user-recipient, e.g. a cup or a mug, to collect such dispensed beverage. The placing area can be delimited by a receptacle support. Typically the support includes a support surface for positioning a user-recipient, e.g. a mug or a cup, to collect the dispensed beverage. The support surface may be formed by a support member that is part of the machine or may be a virtual surface, e.g. the surface of a table on which the machine is placed. Examples of such support surfaces for user-recipients are disclosed in EP 1 867 260, WO 2009/074557 and WO 2013/104636.

When reference is made in the present description to an orientation or position relative to the machine or parts thereof, e.g. "above" or "below" or "vertical" or "horizontal", the orientation or position takes as a reference the position and orientation of the machine in operation to prepare a beverage unless specified otherwise.

BRIEF DESCRIPTION OF THE DRAWINGS

The invention will now be described with reference to the schematic drawings, wherein:

FIG. 1 illustrates part of a machine according to the invention in which the capsule collector is in the seat in its collection position; and FIG. 2 shows the same machine at removal of the collector from the seat.

DETAILED DESCRIPTION

FIGS. 1 and 2, in which the same numeric references designate the same or similar elements, show part of an exemplary machine 1 according to the invention. Machine 1 is configured for preparing a beverage from an ingredient contained in a capsule 100. Compared to machine 1 shown in FIG. 1, minor variations according to the invention are illustrated in FIG. 2, as will be explained below.

Machine 1 has a passage 2 for evacuating such ingredient capsule 100 upon preparing a beverage from such capsule 100 by said machine 1.

Machine 1 includes a capsule collector 10 having a bottom 11 and sidewalls 12,12' delimiting a cavity 13 with a cavity entry opening 14, such as a top opening. Cavity 13 has a cavity volume for storing such used capsules 100.

Machine 1 has a seat 20 positioned so that evacuation passage 2 leads into seat 20. Capsule collector 10 has a collection position in which collector 10 is located in seat 20 for collecting in storage cavity 13 capsules 100 delivered into storage cavity 13 via evacuation passage 2 and entry opening 14. Collector 10 is removable from seat 20 for emptying storage cavity 13.

Seat 20 and collector 10 are configured to adjust the cavity volume of cavity 13 so that the cavity volume is smaller when collector 10 is located in seat 20 and larger at removal of collector 10 from seat 20.

Sidewalls 12,12' of collector 10 have at least one sidewall 12' that is movably mounted in collector 10. Seat 20 and/or movable sidewall 12' includes or is associated with at least one interacting seat member 21.

In the embodiment shown in FIGS. 1 and 2, interacting seat member 21 protrudes inwards from a side 22 of seat and is urged against movable sidewall 12' when collector 10 is in its collection position so that movable sidewall 12' is displaced by seat member 21 towards an inside 10' of cavity 13. Movable sidewall 12' is allowed to move towards an outside 20' of cavity 13 when movable sidewall 12' is withdrawn from seat member 21 and/or when seat member 21 is withdrawn from movable sidewall 12'.

In an alternative embodiment (not show), the interacting seat member protrudes from the movable sidewall towards a side of the seat and is urged thereagainst when the collector is in its collection position so that the movable sidewall is displaced by the seat member towards an inside of the cavity. The movable sidewall being allowed to move towards an outside of the cavity when the movable sidewall with the seat member is withdrawn from the side. To obtain this embodiment, the interacting seat member shown in FIGS. 1 and 2 is transferred from side 22 of seat 20 to movable sidewall 12' so as to follow the movement of movable sidewall 12'.

Seat member 21 can be comprised by or associated with seat 20 and be stationary or movable relative to seat 20.

Seat member 21 (and typically seat 20) may be shielded or substantially shielded by mobile sidewall 12' from any exposure to liquid supplied to cavity 13 via the evacuation passage 2, e.g. liquid carried by such evacuated capsule 100.

Movable sidewall 12' may be allowed to move towards:
the outside 20' of cavity 13 when collector 10 is moved out of seat 20 thereby withdrawing movable sidewall 12' from seat member 21 (or withdrawing the seat member from the movable sidewall) or withdrawing movable sidewall 12' with seat member 21 from side 22 of seat 20; and
the inside 10' of cavity 13 when collector 10 is moved into seat 20 thereby urging movable sidewall 12' against side 22 with seat member 21 or urging seat member 21 with movable sidewall 12' against side 22 of seat 20.

Seat member 21 may be stationary in seat 20.

In a non-illustrated embodiment, the seat member may be movable in seat and associated therewith, the movable sidewall, when the collector is in its collection position, being allowed to move towards: the inside of the cavity when the seat member is moved towards the inside of the cavity; and the outside of the cavity when the seat member is moved opposite the inside of the cavity.

Bottom 11 may delimit in cavity 13 a liquid collection recess 11' having a lowest end. Movable sidewall 12', when moved towards outside 20' as well as when moved towards inside 10' of cavity 13, may be entirely located spaced above the lowest end of the recess 11'. For instance, recess 11' is covered by a partition 11", such as a perforated wall or a grid, for supporting capsules 100 spaced above the lowest end of recess 11' and movable sidewall 12' is entirely located above the partition.

Bottom 11 can be a non-articulated and impervious part, such as a bottom 11 formed as a monolithic element and/or cast and/or machined as a single element.

One or more sidewalls 12 of collector sidewalls 12,12' different to mobile sidewall 12' may be integral with or rigidly fixed to bottom 11 whereas movable sidewall 12' is movable relative to bottom 11.

In a non-illustrated embodiment, the movable sidewall can be translatable towards the inside of the cavity. For instance, the movable sidewall comprises or is associated with or is contacted and urged by the seat member at a middle part and/or at opposite peripheral parts of the movable sidewall.

Movable sidewall 12' may be pivotable towards the inside 10' of cavity 13 and/or towards the outside 20' of cavity 13.

Movable sidewall 12' can be pivotable about an upper end part of movable sidewall 12'.

Movable sidewall 12' may be pivotally mounted via a pivoting bearing 12" to one or more sidewalls 12 of collector 10 different to mobile sidewall 12'. Pivoting bearing 12" can be located at a top or at a middle part of such one or more sidewalls 12. If the pivoting bearing is located at a middle part of such one or more sidewalls and the movable sidewall extends predominantly or essentially below the bearing, a top collector sidewall may be located above the movable sidewall, e.g. between the movable sidewall and a top end of the one or more sidewalls.

Movable sidewall 12' can be lowerable towards to bottom 11 when pivoted towards the inside 10' of cavity 13 and raisable above bottom 11 when pivoted towards the outside 20' of cavity 13.

Movable sidewall 12' may comprise or be associated with or be contacted and urged by seat member 21 at an end part, e.g. a lower end part, or at a middle part of movable sidewall 12'.

Movable sidewall 12' may have towards the cavity inside 10' a generally shovel-like surface. For instance, the shovel-like surface is formed by a pair of opposite, uprightly extending, lateral wings 12''' that are angled towards the inside 10' of cavity 13. Such wings 12''' can be angled along a curved and/or straight direction. The wings 12''' may have a size that is greater at lower part of movable sidewall 12' than at an upper part of movable sidewall 12'.

Collector 10 can have a containment arrangement 12a, 12b configured to prevent, e.g. to physically interfere with, a movement of movable sidewall 12' allowing an escape of a collected capsule 100 from cavity 13 between sidewall 12' and bottom 11. Containment arrangement 12a,12b may prevent a movement of a lower end 12"" of movable sidewall 12' substantially beyond bottom 11 of container 10. Containment arrangement 12a,12b can include a transverse extending member 12a, such as a panel, e.g. a member 12a that delimits a passage 12b for seat member 21 to reach movable sidewall 12'.

Seat 20 can have a front opening 23 and at least one of: a rear face 22 that is opposite front opening 23, collector 10 being insertable into seat 20 towards rear face 22 via front opening 23 until collector 10 is in its collection position; and a side face 24 that is adjacent front opening 23, collector 10 being insertable into seat along side face 22 via front opening 23 until collector 10 is in its collection position. Seat member 21 can be located on or adjacent to seat face 22,24.

Collector 10 may have a single movable sidewall 12', e.g. adjacent to rear face 22 or to the side face when collector 10 is in its collection position.

The collector may have a pair of movable sidewalls, e.g. two movable sidewalls that face each other across the collector's cavity and that are optionally adjacent the front opening or two movable sidewalls that are adjacent to one another and that are optionally adjacent to the rear face and to a side face, when the collector is in its collection position.

The collector may have three movable sidewalls. For instance, such three movable sidewalls have a pair of sidewalls facing each other across the collector's cavity and one movable sidewall extending between the pair of facing movable sidewalls. The movable sidewalls may be adjacent the front opening and the rear face, respectively, when the collector is in its collection position.

Seat 20 can have a or the above front opening 23 and a seat member actuation direction 21' which is:
generally parallel to a direction or insertion of collector 10 into seat 20 and/or a direction of removal of collector 10 from seat 20, seat member 21 acting against movable sidewall 12' or against side 22 of seat 20 along actuation direction 21', movable sidewall 12' extending for instance generally transversely to the insertion and/or removal direction to form a back sidewall 12'; and/or
generally transverse to a direction of insertion of the collector into the seat and/or a direction of removal of the collector from the seat, the movable sidewall extending for instance generally in parallel to the insertion and/or removal direction to form a lateral sidewall, optionally the seat member and movable sidewall or the side of the seat cooperating together along an inclined plane to convert a longitudinal movement of the collector to or from its collection position into a transverse movement of the moveable sidewall.

Seat 20 can have an upper member 25, such as a confinement wall 25, between capsule evacuation passage 2 and an exit area for collector 10 from seat 20. The exit area may be delimited by a or the above front opening 23. Upper member 25 may extend down to a level adjacent to or sufficiently close to cavity entry opening 14 so as to be below an upper end of a capsule 100' substantially protruding through cavity entry opening 14 when capsule collector 10 is located in its collection position and cavity 13 is overfilled with capsules 100. The substantially protruding capsule 100' may then be then lowered in cavity 13 when movable sidewall 12' is allowed to move towards outside 20' of cavity 13 so as to increase the cavity volume at removal of collector 10 from its collection position and.

Upper confinement member 25 may: delimit a or the above front opening 23 of seat 20; and/or be spaced from cavity entry opening 14 by a distance of less than 4 cm, such as in the range of 1.5 to 3.5 cm or below 1.5 cm, for example in the range of 0.5 to 10 mm e.g. 1 to 5 mm.

Capsule collector 10 may be generally tilted out of seat 20, in which case a sufficient distance should space cavity entry opening 14 from upper confinement wall 25, e.g. a distance in the range of 1 to 4.5 cm. Such an embodiment is illustrated in FIG. 1 in which arrow 3 indicates the tilting movement of collector 10.

The capsule collector 10 may be generally translationally withdrawn from the seat, in which case no noticeable distance is required between upper confinement wall 25 and cavity entry opening 14, e.g. a distance in the range of 0.5 mm to 15 mm, such as 1 to 3 mm is sufficient. Such an embodiment is illustrated in FIG. 2 in which arrow 4 indicates the translation movement of collector 10.

A collector's sidewall 12 extending across a seat's front opening 23 can form a front wall 12 of collector 10 that is accessible by a user of machine 1.

Whether collector 10 is tilted and/or translated out of seat 20, collector's front wall 12 may extend above cavity opening 14 and may even extend above upper confinement wall 25. Such a collector front wall may be used as a grip to remove collector 10 from seat 20 and/or as a cover element for machine 1 above seat 20. Such a front wall 12 is illustrated in FIG. 1.

Alternatively, collector's front wall 12 may have a top end at about the level of cavity entry opening 14. Such a front wall 12 is illustrated in FIG. 2.

The cavity volume of cavity 13 when collector 10 is in the seat 20 and movable sidewall 12' is urged towards inside 10' of cavity 13, on the one hand, and the cavity volume of cavity 13 when collector 10 is out of seat 20, on the other hand, may have a volume ratio in the range of 75 to 95%, such as 80-90% e.g. about 85%.

Machine 1 may include an extraction seat for receiving a capsule 100 to be extracted so as to form a beverage and for evacuating to passage 2 such capsule 100 upon extraction. The extraction seat may be connected to an incoming liquid line, such as a water line, that is configured to supply liquid to capsule 100 for its extraction. The liquid line can have a liquid driver e.g. a pump for driving the liquid to the seat and/or a thermal conditioner e.g. a heater and/or a cooler for thermally conditioning the supplied liquid.

The invention claimed is:

1. A machine for preparing a beverage from an ingredient contained in a capsule, the machine comprising:
a passage configured for evacuating the capsule upon preparing the beverage from the capsule by the machine;
a capsule collector having a bottom and sidewalls delimiting a cavity with a cavity entry opening, the cavity having a cavity volume for storing the capsule; and
a seat positioned so that the passage leads into the seat, the capsule collector having a collection position in which the capsule collector is located in the seat for collecting the capsule delivered into the storage cavity via the evacuation passage and the entry opening, the capsule collector being removable from the seat for emptying the storage cavity;
the seat and the capsule collector being configured to adjust the cavity volume of the cavity so that the cavity volume is smaller when the capsule collector is located in the seat and larger when the capsule collector is removed from the seat,
the sidewalls of the capsule collector comprise a movable sidewall that is movably mounted in the capsule collector, the seat and/or the movable sidewall comprising or being associated with at least one interacting seat member configured to:
protrude from the movable sidewall towards a side of the seat and is urged against the side of the seat when the capsule collector is in the collection position so that the movable sidewall is displaced by the at least one interacting seat member towards an inside of the cavity, the movable sidewall being configured to move towards an outside of the cavity when the movable sidewall with the at least one interacting seat member is withdrawn from the side; or
protrude inwards from the side of the seat and is urged against the movable sidewall when the capsule collector is in the collection position so that the movable sidewall is displaced by the at least one interacting seat member towards the inside of the cavity, the movable sidewall being configured to move towards the outside of the cavity when the movable sidewall is withdrawn from the at least one interacting seat member and/or when the at least one interacting seat member is withdrawn from the movable sidewall,
the movable sidewall is configured to move towards:
the outside of the cavity when the capsule collector is moved out of the seat such that the movable sidewall is withdrawn from the at least one interacting seat member, the at least one interacting seat member is withdrawn from the movable sidewall, or the movable sidewall with the at least one interacting seat member is withdrawn from the side of the seat; and the inside of the cavity when the capsule collector is moved into the seat thereby urging the movable sidewall against the side with the at least one interacting seat member or urging the at least one interacting seat member with the movable sidewall against the side of the seat.

2. The machine of claim 1, wherein the at least one interacting seat member is movable in and associated with the seat, and wherein, when the capsule collector is in the collection position, the movable sidewall is allowed to move towards:
the inside of the cavity when the at least one interacting seat member is moved towards the inside of the cavity; and
the outside of the cavity when the at least one interacting seat member is moved opposite the inside of the cavity.

3. The machine of claim 1, wherein the bottom delimits a liquid collection recess in the cavity having a lowest end, and the movable sidewall, when moved towards the outside as well as when moved towards the inside of the cavity, is spaced above the lowest end of the liquid collection recess.

4. The machine of claim 1, wherein the bottom is a non-articulated and impervious part.

5. The machine of claim 1, wherein one or more sidewalls of the sidewalls other than the movable sidewall is integral with or rigidly fixed to the bottom, the movable sidewall being movable relative to the bottom.

6. The machine of claim 1, wherein the movable sidewall is configured to be translated towards the inside of the cavity.

7. The machine of claim 1, wherein the movable sidewall is configured to pivot towards the inside of the cavity and/or towards the outside of the cavity.

8. The machine of claim 1, wherein the movable sidewall comprises uprightly extending, lateral wings that are angled towards the inside of the cavity.

9. The machine of claim 1, wherein the capsule collector has a containment arrangement configured to prevent movement of the movable sidewall that would allow an escape of the capsule from the cavity between the movable sidewall and the bottom.

10. The machine of claim 1, wherein the seat has a front opening and at least one of:
a rear face opposite the front opening, the capsule collector configured to be inserted into the seat towards the rear face via the front opening until the capsule collector is in the collection position; and
a side face adjacent the front opening, the capsule collector configured to be inserted into the seat along the side face via the front opening until the capsule collector is in the collection position.

11. The machine of claim 1, wherein the seat has a front opening and a seat member actuation direction which is:
parallel to a direction of insertion of the capsule collector into the seat and/or a direction of removal of the capsule collector from the seat, the at least one interacting seat member acting against the movable sidewall or against the side of the seat along the seat member actuation direction; and/or
transverse to the direction of insertion of the capsule collector into the seat and/or the direction of removal of the capsule collector from the seat.

12. The machine of claim 1, wherein the seat has an upper member between the passage and an exit area for the capsule collector from the seat, the upper member extending down to a level adjacent to or sufficiently close to the cavity entry opening and below an upper end of a used capsule substantially protruding through the cavity entry opening when the capsule collector is located in the collection position and the cavity is overfilled with a plurality of used capsules including the used capsule, the used capsule substantially protruding through the cavity entry opening being lowered in the cavity when the movable sidewall moves towards the outside of the cavity to increase the cavity volume when the capsule collector is removed from the collection position.

13. The machine of claim 1, wherein the cavity has a first cavity volume when the capsule collector is in the seat and the movable sidewall is urged towards the inside of the cavity, wherein the cavity has a second cavity volume when the capsule collector is out of the seat, and wherein a cavity volume ratio of the first cavity volume to the second cavity volume is in the range of 75 to 95%.

14. The machine of claim 1, comprising an extraction seat configured for receiving the capsule to be extracted to form the beverage and for evacuating the capsule to the passage upon extraction.

15. A machine for preparing a beverage from an ingredient contained in a capsule, the machine comprising:
a passage configured for evacuating the capsule upon preparing the beverage from the capsule by the machine;
a capsule collector having a bottom and sidewalls delimiting a cavity with a cavity entry opening, the cavity having a cavity volume for storing the capsule; and
a seat positioned so that the passage leads into the seat, the capsule collector having a collection position in which the capsule collector is located in the seat for collecting the capsule delivered into the storage cavity via the evacuation passage and the entry opening, the capsule collector being removable from the seat for emptying the storage cavity;
the seat and the capsule collector being configured to adjust the cavity volume of the cavity so that the cavity volume is smaller when the capsule collector is located in the seat and larger when the capsule collector is removed from the seat,
the sidewalls of the capsule collector comprise a movable sidewall that is movably mounted in the capsule collector, the seat and/or the movable sidewall comprising or being associated with at least one interacting seat member configured to:
protrude from the movable sidewall towards a side of the seat and is urged against the side of the seat when the capsule collector is in the collection position so that the movable sidewall is displaced by the at least one interacting seat member towards an inside of the cavity, the movable sidewall being configured to move towards an outside of the cavity when the movable sidewall with the at least one interacting seat member is withdrawn from the side; or
protrude inwards from the side of the seat and is urged against the movable sidewall when the capsule collector is in the collection position so that the movable sidewall is displaced by the at least one interacting seat member towards the inside of the cavity, the movable sidewall being configured to move towards the outside of the cavity when the movable sidewall is withdrawn from the at least one interacting seat member and/or when the at least one interacting seat member is withdrawn from the movable sidewall,
the movable sidewall is configured to be translated towards the inside of the cavity, the movable sidewall comprises, is associated with, or is configured to be contacted and urged by the at least one interacting seat member at a middle part of the movable sidewall.

16. A machine for preparing a beverage from an ingredient contained in a capsule, the machine comprising:
- a passage configured for evacuating the capsule upon preparing the beverage from the capsule by the machine;
- a capsule collector having a bottom and sidewalls delimiting a cavity with a cavity entry opening, the cavity having a cavity volume for storing the capsule; and
- a seat positioned so that the passage leads into the seat, the capsule collector having a collection position in which the capsule collector is located in the seat for collecting the capsule delivered into the storage cavity via the evacuation passage and the entry opening, the capsule collector being removable from the seat for emptying the storage cavity;
- the seat and the capsule collector being configured to adjust the cavity volume of the cavity so that the cavity volume is smaller when the capsule collector is located in the seat and larger when the capsule collector is removed from the seat,
- the sidewalls of the capsule collector comprise a movable sidewall that is movably mounted in the capsule collector, the seat and/or the movable sidewall comprising or being associated with at least one interacting seat member configured to:
  - protrude from the movable sidewall towards a side of the seat and is urged against the side of the seat when the capsule collector is in the collection position so that the movable sidewall is displaced by the at least one interacting seat member towards an inside of the cavity, the movable sidewall being configured to move towards an outside of the cavity when the movable sidewall with the at least one interacting seat member is withdrawn from the side; or
  - protrude inwards from the side of the seat and is urged against the movable sidewall when the capsule collector is in the collection position so that the movable sidewall is displaced by the at least one interacting seat member towards the inside of the cavity, the movable sidewall being configured to move towards the outside of the cavity when the movable sidewall is withdrawn from the at least one interacting seat member and/or when the at least one interacting seat member is withdrawn from the movable sidewall,
- wherein the seat has a front opening and a seat member actuation direction which is:
- parallel to a direction of insertion of the capsule collector into the seat and/or a direction of removal of the capsule collector from the seat, the at least one interacting seat member acting against the movable sidewall or against the side of the seat along the seat member actuation direction; and/or
- transverse to the direction of insertion of the capsule collector into the seat and/or the direction of removal of the capsule collector from the seat,
- when the seat member actuation direction is parallel to the direction of insertion and/or the direction of removal, the movable sidewall extends transversally to the direction of insertion and/or the direction of removal to form a back sidewall, and wherein, when the seat member actuation direction is transverse to the direction of insertion and/or the direction of removal, the movable sidewall extends parallel to the direction of insertion and/or the direction of removal to form a lateral sidewall.

17. A machine for preparing a beverage from an ingredient contained in a capsule, the machine comprising:
- a passage configured for evacuating the capsule upon preparing the beverage from the capsule by the machine;
- a capsule collector having a bottom and sidewalls delimiting a cavity with a cavity entry opening, the cavity having a cavity volume for storing the capsule;
- a seat positioned so that the passage leads into the seat, the capsule collector having a collection position in which the capsule collector is located in the seat for collecting the capsule delivered into the storage cavity via the evacuation passage and the entry opening, the capsule collector being removable from the seat for emptying the storage cavity;
- the seat and the capsule collector being configured to adjust the cavity volume of the cavity so that the cavity volume is smaller when the capsule collector is located in the seat and larger when the capsule collector is removed from the seat,
- the sidewalls of the capsule collector comprise a movable sidewall that is movably mounted in the capsule collector, the seat and/or the movable sidewall comprising or being associated with at least one interacting seat member configured to:
  - protrude from the movable sidewall towards a side of the seat and is urged against the side of the seat when the capsule collector is in the collection position so that the movable sidewall is displaced by the at least one interacting seat member towards an inside of the cavity, the movable sidewall being configured to move towards an outside of the cavity when the movable sidewall with the at least one interacting seat member is withdrawn from the side; or
- protrude inwards from the side of the seat and is urged against the movable sidewall when the capsule collector is in the collection position so that the movable sidewall is displaced by the at least one interacting seat member towards the inside of the cavity, the movable sidewall being configured to move towards the outside of the cavity when the movable sidewall is withdrawn from the at least one interacting seat member and/or when the at least one interacting seat member is withdrawn from the movable sidewall; and
- an extraction seat configured for receiving the capsule to be extracted to form the beverage and for evacuating the capsule to the passage upon extraction, the extraction seat is configured to be connected to an incoming liquid line, the incoming liquid line being configured to supply liquid to the capsule for extraction.

18. A machine for preparing a beverage from an ingredient contained in a capsule, the machine comprising:
- a passage configured for evacuating the capsule upon preparing the beverage from the capsule by the machine;
- a capsule collector having a bottom and sidewalls delimiting a cavity with a cavity entry opening, the cavity having a cavity volume for storing the capsule; and
- a seat positioned so that the passage leads into the seat, the capsule collector having a collection position in which the capsule collector is located in the seat for collecting the capsule delivered into the storage cavity via the evacuation passage and the entry opening, the capsule collector being removable from the seat for emptying the storage cavity;

the seat and the capsule collector being configured to adjust the cavity volume of the cavity so that the cavity volume is smaller when the capsule collector is located in the seat and larger when the capsule collector is removed from the seat, the sidewalls of the capsule collector comprise a movable sidewall that is movably mounted in the capsule collector, the seat and/or the movable sidewall comprising or being associated with at least one interacting seat member configured to:

protrude from the movable sidewall towards a side of the seat and is urged against the side of the seat when the capsule collector is in the collection position so that the movable sidewall is displaced by the at least one interacting seat member towards an inside of the cavity, the movable sidewall being configured to move towards an outside of the cavity when the movable sidewall with the at least one interacting seat member is withdrawn from the side; or protrude inwards from the side of the seat and is urged against the movable sidewall when the capsule collector is in the collection position so that the movable sidewall is displaced by the at least one interacting seat member towards the inside of the cavity, the movable sidewall being configured to move towards the outside of the cavity when the movable sidewall is withdrawn from the at least one interacting seat member and/or when the at least one interacting seat member is withdrawn from the movable sidewall, the movable sidewall is pivotally mounted by a pivoting bearing to a further sidewall of the sidewalls of the capsule collector.

19. The machine of claim 18, wherein the pivoting bearing is located at a top or a middle part of the further sidewall.

20. The machine of claim 15, wherein the at least one interacting seat member is movable in and associated with the seat, and wherein, when the capsule collector is in the collection position, the movable sidewall is allowed to move towards:

the inside of the cavity when the at least one interacting seat member is moved towards the inside of the cavity; and the outside of the cavity when the at least one interacting seat member is moved opposite the inside of the cavity.

* * * * *